P. ESCH.
METHOD OF MAKING U-SHAPED PIPE BENDS.
APPLICATION FILED SEPT. 22, 1910.

1,074,783.

Patented Oct. 7, 1913.

WITNESSES:

INVENTOR
PETER ESCH
BY
ATTORNEYS

UNITED STATES PATENT OFFICE.

PETER ESCH, OF DUSSELDORF, GERMANY, ASSIGNOR TO SCHMIDT'SCHE HEISSDAMPF-GESELLSCHAFT MIT BESCHRANKTER HAFTUNG, OF CASSEL, GERMANY, A CORPORATION OF GERMANY.

METHOD OF MAKING U-SHAPED PIPE-BENDS.

1,074,783.  Specification of Letters Patent.  Patented Oct. 7, 1913.

Application filed September 22, 1910.  Serial No. 583,171.

*To all whom it may concern:*

Be it known that I, PETER ESCH, a subject of the German Emperor, residing at Dusseldorf, Germany, have invented a new and useful Improvement in a Method of Making U-Shaped Pipe-Bends, of which the following is a specification.

My invention concerns the making of U-shaped pipe bends and particularly such bends when used in connection with boilers, superheaters and generally when exposed to high temperatures or when used to carry steam or fluids under pressure.

My invention relates particularly to such bends as aforesaid when the two legs of the bend are required to be very close together.

A primary object of my invention is to provide a method of making pipe bends which shall involve very simple tools and accessories and an inexpensive labor factor and yet result in the production of bends of great strength and uniform character.

Other objects of my invention will appear as the specification proceeds.

My improved method of making U-shaped pipe bends consists essentially in first preparing by any suitable method an element comprising two lengths of tube connected by a bridge piece and then welding to such bridge piece and the adjacent tube ends the edge or rim of an appropriate bell or dome-shaped cap.

Figure 1:
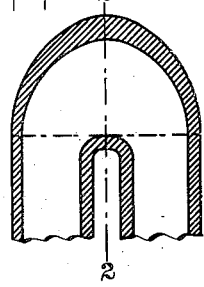
Figure 2:
Figure 3:
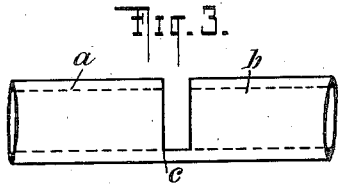
Figure 8:
Figure 4:
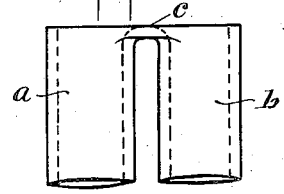
Figure 6:
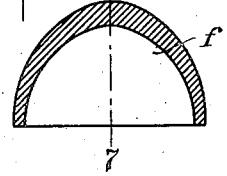
Figure 7:
Figure 5:
Figure 9:
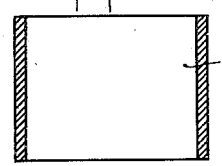
Figure 11:
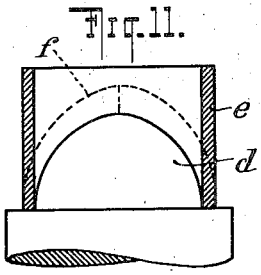
Figure 10:
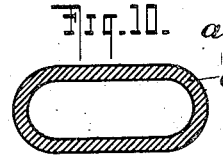
Figures 12, 13:
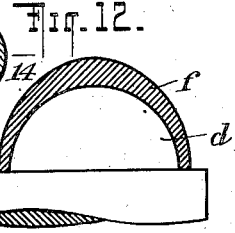
Figure 14:
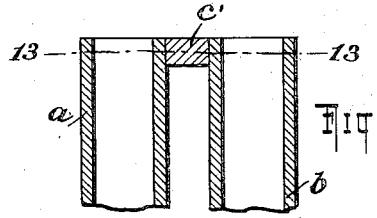

Referring to the drawings, Figure 1 represents a central section through the two legs of a preferred form of U bend made according to my invention; Fig. 2 is a section taken on the line 2—2 of Fig. 1; Figs. 3 and 4 show the first and second steps in the production of the element to which the cap is to be welded; Fig. 5 is a plan view of Fig. 4; Fig. 6 represents a longitudinal section through a preferred form of cap; Fig. 7 is a section taken along the line 7—7 of Fig. 6; Fig. 8 is a sectional plan view taken from below of Fig. 6; Fig. 9 is a longitudinal section taken on the longer axis of the flattened tube from which the cap of Fig. 6 is made; Fig. 10 is a cross section of the same tube; Fig. 11 illustrates the way in which the cap of Fig. 6 is made, the dotted construction showing the two steps of the method; Fig. 12 shows a modified form of cap together with a mandrel used in this construction; and Figs. 13 and 14 show respectively a horizontal section (line 13—13 Fig. 14), and a central longitudinal section (line 14—14 Fig. 13) of a modified form of U-bend made according to my invention, the hollow cap being omitted.

The form of bend shown in the figures is preferably made as follows: A tube of suitable bore and wall thickness is selected and a pair of transverse cuts made nearly through, the incomplete ring lying between these cuts then being removed; this results in a pair of ends, $a$, $b$ connected by a narrow bridge piece $c$. These two legs $a$, $b$ are then bent downwardly about a transverse axis through the bridge piece $c$ (Fig. 4) and constitute the legs of the bend which is to be formed; the length of the bridge piece $c$, itself fixed by the distance between the original cuts, determines the distance between the legs. To complete the U bend a flattened piece of tube $e$, (Figs. 9 and 10), the cross-section of which is such that its curves will coincide with the curves of the two lengths $a$, $b$, is employed. This tube is mounted upon a mandrel $d$, (Fig. 11) and its free end or edge suitably folded or formed upon the mandrel until it assumes the shape shown dotted in Fig. 11, the butt-joint being finally closed by welding. The cap $f$ thus produced has its sides bent inwardly (Figs. 7 and 8) so as to conform with the two bends $a$, $b$, and their connecting bridge piece, and is then welded in position, thus producing a completed bend as shown in Figs. 1 and 2.

Instead of producing the leg element of Fig. 4 from a single tube by cutting as has been described, various other procedures may be used without departing from the spirit of my invention. For example, (Figs. 13 and 14) two separate tube lengths may be squared off, placed side by side at the required distance apart, and then have a separate bridge piece $c'$ of suitable length welded to them. The mandrel $d$ may also be varied in shape according as taste or special requirements may dictate. Furthermore, instead of forming the cap $f$ from a piece of flattened tube mounted upon a mandrel, I may, if I desire, make this cap by pressing from a single piece of metal. Other ways of making this cap may conceivably be employed.

An advantage of making tube bends in the manner described is that it is unnecessary to do any welding in the often very narrow and unaccessible portion lying between the two legs a, b, (Fig. 4). Furthermore, in forming the bend, it is only necessary to handle two elements, namely, the two tube lengths connected by the bridge piece and the cap.

When the caps are made as has just been described for Figs. 9 to 12, the thickening or reinforcement of the tip or cap is obtained entirely from the material of the cap itself and results naturally from the folding over of the tube edges. This thickening at this particular point is very desirable, as it is at this point as a rule that the bend is exposed to the hottest furnace gases. The known method of adding extra material by welding is obviously more expensive as well as less durable and strong.

The process and product as above described substantially utilizes all the raw material, while possessing the additional advantage that the legs of the bend may be placed as close together as may be desired.

Having described my invention, I claim—

1. The method of making U-shaped pipe bends which consists in uniting two legs by a bridge piece and then uniting the open edges of a cup-shaped or hollow cap to the edges of the bridge piece and adjacent legs, substantially as and for the purpose described.

2. The method of making U-shaped pipe bends which consists in uniting two legs by a bridge piece, then forming a hollow cap by taking a short length of flattened tube and closing one end thereof, and finally uniting the open edges of said cap to the edges of the bridge piece and adjacent legs, substantially as and for the purpose described.

3. The method of making U-shaped pipe bends which consists in uniting two legs by a bridge piece, then forming a hollow cap by taking a short length of flattened tube and closing one end thereof by pressing upon a mandrel, and welding, and finally uniting the edges of the bridge piece and adjacent legs, substantially as and for the purpose described.

4. The method of making U-shaped pipe bends which comprises uniting two pipe ends and in then uniting a cup shaped or hollow cap to the free edges of said ends.

5. The method of making U-shaped pipe bends which comprises approaching two pipe ends and uniting them along adjacent edges and in then uniting a cup shaped or hollow cap to the remaining edges of said ends.

6. The herein described process of connecting the ends of substantially parallel metal pipes which consists in placing a filler piece between said pipes at the end and welding it in position, and placing a cap over said ends and filler and welding said cap in place.

7. The herein described process of connecting the ends of substantially parallel metal pipes which consists in placing a filler piece between said pipes at the end and welding it in position, and placing a cap over said ends and filler and welding said cap to said pipes and to said filler along its edge.

8. The herein described process of connecting the ends of substantially parallel metal pipes which consists in placing a closely fitting filler piece between said pipes, flush with their ends and with their sides, welding said parts together, fitting an oblong cap over the ends of said pipes and over said filler piece, the margin of said cap being flush with the sides of said pipes and filler, and welding said cap in place.

9. The method of making pipe bends which consists in providing two legs united by a bridge piece and then uniting the open edges of a cup shaped or hollow cap to the edges of the bridge piece and adjacent legs, substantially as and for the purpose described.

10. The method of making pipe bends which consists in providing two legs united by a bridge piece, then forming a hollow cap by taking a short length of flattened tube and closing one end thereof, and finally uniting the open edges of said cap to the edges of the bridge piece and adjacent legs, substantially as and for the purpose described.

In testimony whereof I have hereunto set my hand in the presence of two subscribing witnesses.

PETER ESCH. [L. S.]

Witnesses:
 WALTER VONNEGUT,
 ALFRED HENKEL.